United States Patent [19]

Andersson et al.

[11] 4,362,778
[45] Dec. 7, 1982

[54] FOAM COMPOSITE MATERIAL IMPREGNATED WITH RESIN

[75] Inventors: Bengt Andersson, Söraker; Olof Tanner, Sundsvall, both of Sweden

[73] Assignee: KemaNord AB, Stockholm, Sweden

[21] Appl. No.: 260,677

[22] Filed: May 5, 1981

[30] Foreign Application Priority Data

May 21, 1980 [SE] Sweden .............................. 8003776

[51] Int. Cl.³ .......................... B32B 5/00; B32B 5/20
[52] U.S. Cl. .................................. 428/240; 428/269;
428/278; 428/283; 428/304.4; 428/313.5;
428/316.6; 428/317.9
[58] Field of Search ............... 428/306, 307, 313, 314,
428/240, 269, 278, 283, 304.4, 305.5, 313.5,
316.6, 317.9, 327, 338

[56] References Cited

U.S. PATENT DOCUMENTS

| | | | |
|---|---|---|---|
| 2,862,834 | 12/1958 | Hiler | 428/313 |
| 2,885,303 | 5/1959 | Kaplan | 428/240 |
| 2,959,508 | 11/1960 | Graham et al. | 428/313 |
| 3,396,923 | 8/1968 | Windecker | 428/315 |
| 3,488,714 | 1/1970 | Walters et al. | 428/307 |
| 3,616,172 | 10/1971 | Rubens | 428/306 |
| 3,676,288 | 7/1972 | Hoyle | 428/306 |
| 3,864,181 | 2/1975 | Wolinski et al. | 428/310 |
| 4,046,937 | 9/1977 | McCaskey, Jr. | 428/278 |
| 4,201,823 | 5/1980 | Russell | 428/285 |

Primary Examiner—William J. Van Balen
Attorney, Agent, or Firm—Fred Philpitt

[57] ABSTRACT

The invention relates to a foam composite material which comprises a material in web form impregnated with a curable resin. The resin in the foam composite material is in the B-stage. The foam composite material further contains expanded thermoplastic particles which are essentially uniformly distributed in the resin and in the web material. The invention also relates to laminates prepared by use of the foam composite material and a method for the manufacture of such laminates.

11 Claims, No Drawings

FOAM COMPOSITE MATERIAL IMPREGNATED WITH RESIN

The present invention concerns a foam composite material which is impregnated with resin, a laminate containing that material and a method for manufacture of such a laminate. Specifically, the invention concerns a foam composite material comprising a web, which is impregnated with a thermosetting resin and which contains expanded thermoplastic particles. The foam composite material according to the invention is preferably used for modifying surfaces.

The foam composite material may for instance be prepared in the following way. A pre-condensate of a water based thermosetting resin is prepared conventionally and the amount of water is adjusted in order to obtain 30 to 75 percent by weight dry substance. To the solution obtained is added non-expanded thermoplastic particles, known as microspheres, in an amount such that the weight ratio microspheres:resin varies between 4:1 and 1:50 in the finished foam composite material. In expanded condition, the microspheres preferably constitute 70–95, specifically 85–95, percent by volume of the foam composite material. A material in the form of a web is impregnated with the mixture of resin and microspheres in a conventional way, e.g. by immersing the web in a bath of the mixture by spraying the mixture on the web or by adding the mixture in connection with the formation of the web. The impregnated web, the degree of impregnation of which can be adjusted e.g. by rolls, is then treated thermally, suitably with circulating hot air having a temperature of 80°–150° C. so that the resin sets to the B-stage and the microspheres expand. It should be noted in this context that a thermosetting resin in the A-stage is meltable, poorly cross-linked and soluble in acetone and other solvents. A C-stage resin is not meltable, completely cross-linked and insoluble. The B-stage is a stage between the A-stage and the C-stage.

Thermosetting resins that may be used according to the present invention are resins based on formaldehyde with urea, phenol, resorcinol or melamine.

The web material may consist of woven or non-woven organic or inorganic material and specifically glass fibre, mineral fibre, cellulose fibre and polyester may be mentioned. It is also important that the web material has sufficient porosity so that it can be impregnated with the mixture or resin and microspheres in a satisfying manner. Further, the web material must not be taken too thick and suitably the thickness may vary between 0.1 and 5 mm. The reason why the web material must be thin is that otherwise there may be a non-uniform expansion of microspheres owing to the fact that, at the thermal treatment, superficially situated microspheres expand first and these expanded microspheres form a thermally, insulating layer preventing those microspheres which are situated more deeply or more central from expanding and if this happens a product of inferior quality, which is not homogenous, will be obtained.

It is also possible to add the resin and/or the microspheres in connection with the formation of the web, e.g. by the direct manufacture of the web by depositing a fibre suspension also containing resin and/or microspheres. Alternatively the resin and/or microspheres can be added in connection with deposition of fibres from air into a web. A so prepared web can be treated in the same way as an impregnated ready web, i.e. being heated afterwards to expand the microspheres and to transform the resin into the B-stage. It is, however, also possible in these cases to add already expanded particles to the web at deposition of this since no impregnation step is required. This can be done with special simplicity at deposition of the web from air since then the buoyancy of the expanded particles causes no problems. When the microspheres are expanded before or during the deposition of the web it is possible to make the web thicker than when the expansion is made by heating the impregnated web since no heat transfer problems will arise in this connection. The manufacture of a thicker layer without the need for laminating together several thin sheets is of value in certain connections, especially when the strength demands are lower. It is also possible to produce in this way first a very porous web, which by pressing can be given a variable density or a more complicated final shape. The product can otherwise be used in the same way as a foam composite material prepared by impregnation of a ready web.

The microspheres which are used when preparing the foam composite material according to the present invention have shells which may be made up of copolymers of vinyl chloride and vinylidene chloride, copolymers of vinylidene chloride and acrylonitrile, copolymers of vinyl chloride and acrylonitrile and copolymers of styrene and acrylonitrile. Further, copolymers of methyl metacrylate containing up to 20 percent by weight styrene, copolymers of methyl metacrylate and up to 50 percent by weight of combined monomers of ethyl metacrylate, copolymers of methyl metacrylate and up to about 70 percent by weight of ortochlorostyrene may be mentioned. The particle size of the non-expanded particles and, accordingly, the expanded particles may vary within broad limits and is selected with respect to the properties desired for the finished product. Examples of particle sizes for the non-expanded spheres are 1 $\mu$m to 1 mm, preferably 2 $\mu$m to 0.5 mm and specifically 5 $\mu$m to 50 $\mu$m. At the expansion the diameter of the microspheres increases by a factor 2–5. The non-expanded microspheres contain volatile, liquid blowing agents which are vaporized at the application of heat. The blowing agents may consist of freones, hydrocarbons, such as n-pentane, isopentane, neopentane, butane, isobutane or other blowing agents, that are used conventionally in microspheres of the type specified above. Suitably 5–30 percent by weight of the microspheres may consists of blowing agent. The microspheres may be added to the resin solution in the form of dried particles or in the form of a suspension, for instance in an alcohol such as methanol.

As mentioned previously, the ratio resin to microspheres in the impregnating solution may vary within broad limits and this ratio affects the properties of the final product. Correspondingly, starting from certain fields of employment and certain desired properties of the final product it is also possible to select a suitable ratio resin to microspheres in the mixture. This ratio can easily be determined by preparatory experiments in the laboratory.

Different additives such as stabilizers, coupling agents, fillers, flame retarding agents and/or pigments may be added to the mixture of resin and the microspheres if desired or required.

The foam composite materials according to the invention may be used in combination with substrates or supporting layers, preferably wood blades supporting layers, for preparing laminates and these laminates are called heterogenous laminates in the following test. It is also possible to laminate several layers of the foam composite material according to the invention for the preparation of multilaminates and these laminates will be called homogenous laminates in the following test. It is certainly also possible to produce mixed laminates containing at least one homogenous laminate together with at least one other material.

In the preparation of the heterogenous laminates the foam composite material according to the invention is combined with an optional supporting layer and the combination of the foam composite material and the supporting layer is compressed at an elevated temperature. In this process time, temperature and pressure are chosen mainly with consideration taken to the type of resin used. Often the time for the pressing may vary between 20 seconds and 20 minutes. The temperature may vary between 100° and 180° C. and the pressure between 0.1 and 3 MPa. If the supporting layer has a rough and uneven surface especially attractive effects may be attained by the foam composite material penetrating the cavities and filling these up, while the "free" surface of the foam composite material, i.e. the surface that is facing the press plate, becomes completely smooth, as the microspheres adjacent to the press plate collapses by the pressure while expanded microspheres adjacent the rough surface of the supporting layer penetrates into the cavities filling these up. Accordingly, a levelling out of the surface is effected. In practice this effect of levelling out can be achieved for example in connection with the preparation of plywood. In conventional plywood preparation sized veneers are prepared first and the veneers are compacted to plywood. In order to get a satisfying surface the rough surface is then ground and a surface coating is then pressed onto the plywood surface. Using the foam composite material according to the present invention it is possible to press together several veneer sheets and a thin sheet of a foam composite material in one single step and, after pressing, there is obtained a hard completely smooth surface layer consisting of a foam composite material according to the invention, in which material the resin is completely cured and the microspheres have collapsed partly. Other properties which can be obtained in heterogenous laminates containing a foam composite material according to the invention are improved flame retarding properties. It is possible to get a laminate surface suitable for painting and (wall) paper covering, to get a higher flexural modulus and a surface that is water repellant and thermal insulating. In sheet material a decrease of the skew of the plate, may be achieved.

Lamination with wood gives a material with the surface properties of wood but with a reduced density, which is usable for example in packings, coachworks or interior fittings. Lamination with metals, especially aluminium sheets or aluminium foils, gives a material with good and lasting surface properties and high stiffness but with reduced density, which can be used for example in packings, coachworks, building frontages, signboards or travel requisites. Lamination with papers, impregnated with formaldehyde-based resins, gives materials with resistant and/or decorative surfaces, high stiffness and low density suited for example in interior fittings, panels and signboards. In order to improve the adhesion between the impregnated paper and the foam composite material and to reduce the effects of the brittleness of the material it is in these cases advantageous to arrange a middle sheet of for example cardboard. Lamination of materials with thermoplastic surfaces can give light decorative products suitable in interior fittings and for panels. A coating of nylon flocks on the foam composite material gives a decorative and durable surface allowing pin attachments, which product is usable for example in notice-boards, interior fittings and signboards. Similar properties and uses flows from laminates with textiles. Numerous other heterogenous laminates are of course possible. It is also possible to adhere the foam composite material of the invention against non-solid materials at the formation of these, for example to foam polyurethane against the foam composite material, preferably between two sheets of these, whereby not only a light and in relation to the weight stiff product is obtained but also is achieved a more uniform foaming of the polyurethane material due to the low heat conduction and heat capacity of the foam composite material. The covering sheets also gives a fire resistant effect reactive to the polyurethane foam. The mentioned properties are of special value when using the product as building elements. It is generally possible in heterogenous laminates to introduce a middle sheet between the different materials in order to improve stiffness, adhesion and dent resistance. A suitably selected middle layer can be bonded against the foam composite material by use of the remaining bonding capacity of the resin in the material in accordance with a general purpose of the invention and at the same time, on its other side, allow glueing to materials normally not bondable by the resin of the foam composite material. For example paper or a fiber web can be used for this purpose and it is especially advantageous that the sheet is impregnated with a curable resin, preferably the same as in the foam composite material or a resin compatible with this.

The homogenous laminates are prepared with pressure times varying between 1 minute and 30 minutes. The pressure may suitably vary between 0.01 to 0.5 MPa and the temperatures between 100° and 150° C. Preferably such conditions are chosen that the expanded microspheres do not collapse. A light weight and strong material which for example may be used in the building trade is obtained if the microspheres do not collapse. Furthermore, it should be noted that the layer can be laminated by glueing without the application of heat.

The foam composite material is heat mouldable in non-cured condition, which for example allows formation of double-bent surfaces in connection with lamination. Such a moulding can take place both at manufacture of homogenous laminates and at manufacture of heterogenous laminates wherein the other materials are preformed or allows deformation under the lamination procedure.

The invention will be illustrated more in detail in the following non limiting examples.

EXAMPLE 1

A 50 g/m$^2$ felt of glass fibre was impregnated with a dispersion of VDC/ACN microspheres from Kema-Nord AB and a phenol resin solution 9916 from AB Casco having dry substances of 60%, wherein the ratio of the dry substances MS:PF is 2:1 (VDC=vinylidene chloride, ACN=acrylonitrile, MS=microspheres, PF=phenol formaldehyde resin).

When the felt has been immersed in the impregnating bath excessive dispersion is pressed away by rolls. Then the felt is treated with air (120° C.) causing the water to leave until 7 percent by weight remain and simultaneously the microspheres expand. A homogenous laminate was prepared by superimposing four layers and pressing at 0.25 MPa, 125° C. for 10 minutes.

The following product was obtained:

| Thickness | 7.10 mm | |
|---|---|---|
| Density | 162 kg m$^{-3}$ | |
| Flexural modulus | 248 N/mm$^2$ | |
| Flexural strength | 4.68 N/mm$^2$ | |
| E modulus pressure | 15.66 N/mm$^2$ | |
| Compression strength, 10% deformation | 0.78 N/mm$^2$ | |
| Smoke | 2.8% | KemaNord PM 227 Smoke development according to Arapahoe |
| Oxygen index | 45 | ASTM 2863 |

This product can preferably be used as a core or surface material in sandwich structures. The homogenous laminate can be moulded at a temperature of about 120° C.

EXAMPLE 2

The processing according to example 1 was repeated but the ratio MS:PF was 1:1 (calculated on the dry substances).

The following product was obtained:

| Thickness | 4.09 mm | |
|---|---|---|
| Density | 264 kg m$^{-3}$ | |
| Flexural modulus | 574 N/mm$^2$ | |
| Flexural strength | 12.22 N/mm$^2$ | |
| E modulus pressure | 31.11 N/mm$^2$ | |
| Compression strength, 10% deformation | 1.89 N/mm$^2$ | |
| Smoke | 2.4% | KemaNord PM 227 Smoke development according to Arapahoe |
| Oxygen index | 45 | ASTM 2863 |

This product can be used in sandwich structures.

EXAMPLE 3

The process according to example 1 was repeated but the ratio MS:PF was 1:2 (calculated on the dry substances).

The following product was obtained:

| Thickness | 3.1 mm | |
|---|---|---|
| Density | 306 kg/m$^{-3}$ | |
| Flexural modulus | 799 N/mm$^2$ | |
| Flexural strength | 20.16 N/mm$^2$ | |
| E modulus pressure | 40.19 N/mm$^2$ | |
| Compression strength, 10% deformation | 3.85 N/mm$^2$ | |
| Smoke | 1.8% | KemaNord PM 227 Smoke development according to Arapahoe |
| Oxygen index | 42 | ASTM 2863 |
| Flame-proof surface layer class 3 NT 004 | | |
| Average smoke density | 9% | |

The product can be used in sandwich structures.

EXAMPLE 4

A foam fibre layer was prepared according to example 1 but the ratio MS:PF was 1:2, calculated on the dry substance. This sheet was pressed onto a plasterboard at a pressure of 0.4 MPa and a temperature of 120° C. for 10 minutes, and a decorative surface suitable for embossing was obtained. At fire testing NT 004 class 1 is obtained on the surface and no smoke is developed.

EXAMPLE 5

Example 4 was repeated but a 10 mm unground spruce plywood was used as a supporting layer.

A levelling out of the surface was obtained and the surface was waterproof and suitable for painting and covering with wall paper.

The surface can further be decorative and suitable for embossing. The products have improved stiffness and are as far as fire is concerned classified as flame-proof surface layer class 3, average smoke density 13%.

We claim:

1. A laminate comprising:
   a foam composite material and at least one further such a material or another sheet material in which each foam composite material includes
   (a) a material in the form of a thin web,
   (b) a curable resin in the C-stage, i.e. which has passed from an initial uncured A-stage, in which the resin is meltable, poorly cross-linked and soluble in solvents, via an intermediate B-stage to a cured C-stage, in which the resin is not meltable, completely cross-linked and insoluble, and
   (c) expanded thermoplastic microspheres and in which foam composite materials, the curable resin and the microspheres are uniformly distributed in the web material and whereby at least two materials are bonded to each other by a transition from B-stage to C-stage of the curable resin.

2. The laminate of claim 1 characterized in that it comprises a foam composite material wherein the web material has a thickness between 0.1 and 5 mm.

3. The laminate of claim 1, characterized in that it comprises at least two foam composite material sheets.

4. The laminate of claim 1, characterized in that the resin in the foam composite material consists of a formaldehyde-based resin with phenol, resorcinol, urea and/or melamine.

5. A foam composite material comprising:
   (a) a material in the form of a thin web,
   (b) a curable resin in the B-stage, i.e. in a stage between an uncured A-stage in which the resin is meltable, poorly cross-linked and soluble in solvents, and a C-stage in which the resin is not meltable, completely cross-linked and insoluble, and
   (c) expanded thermoplastic microspheres wherein the curable resin and the microspheres are uniformly distributed in the web material by impregnation of the web or mixing with the discrete fibers before or at the formation of the web.

6. A foam composite material according to claim 5, characterized in that, the curable resin is a formaldehyde based resin with phenol, resorcinol, carbamide or melamine.

7. A foam composite material according to claims 5 or 6, characterized in that the expanded thermoplastic particles have a shell made up from a copolymer of vinylidene chloride and acrylonitrile.

8. A foam composite material according to any of claims 5 or 6 characterized in that the expanded thermoplastic particles are present in an amount of 70–95, preferably 85–95, percent by volume.

9. A laminate according to claim 1 wherein said at least one foam composite material is assembled with at least one further such material or another material and that the materials are bonded to each other by a final curing of said resin which is a B-stage resin.

10. The laminate of claim 9 wherein said final curing of said resin takes place under the influence of heat and pressure.

11. The laminate of claim 9 wherein said foam composite material is prepared by impregnation of the web material with expandable thermoplastic particles and a solution of said resin and heat is then added to expand the thermoplastic particles and to transform said resin into the B-stage.

* * * * *